United States Patent [19]

Dequet

[11] Patent Number: 4,467,549

[45] Date of Patent: Aug. 28, 1984

[54] FISHING ROD

[76] Inventor: Jean W. Dequet, Würmseestrasse 26b, Munich, Fed. Rep. of Germany

[21] Appl. No.: 302,893

[22] Filed: Sep. 16, 1981

[30] Foreign Application Priority Data

Sep. 16, 1980 [DE] Fed. Rep. of Germany ... 8024724[U]
Feb. 17, 1981 [DE] Fed. Rep. of Germany ....... 3105770

[51] Int. Cl.$^3$ .............................................. A01K 87/04
[52] U.S. Cl. ................................... 43/24; 242/157 R; 403/391; 403/392
[58] Field of Search ................. 43/24, 25; 242/157 R; 156/172, 173; 403/391, 392

[56] References Cited

U.S. PATENT DOCUMENTS

| 682,730 | 9/1901 | Mitchell | 43/24 |
|---|---|---|---|
| 1,923,263 | 8/1933 | Heddon et al. | 43/24 |
| 2,296,174 | 9/1942 | Meisler | 43/24 |
| 2,317,129 | 2/1942 | Brown | 43/24 |
| 2,544,238 | 5/1949 | Ritter | 43/24 |
| 3,099,889 | 8/1963 | Verneuil | 43/24 |
| 3,171,228 | 3/1965 | Cwik | 43/24 |
| 3,393,918 | 7/1968 | Styka | 156/172 X |
| 4,174,583 | 11/1979 | Ohmura | 43/24 |
| 4,186,508 | 2/1980 | Howald | 43/24 |
| 4,196,537 | 4/1980 | Ohmura | 43/24 |
| 4,273,599 | 6/1981 | Butt | 156/172 |
| 4,287,678 | 9/1981 | Yamamoto | 43/24 |
| 4,320,823 | 3/1982 | Covaleski | 156/172 X |

FOREIGN PATENT DOCUMENTS

| 1360248 | 3/1963 | France . |
|---|---|---|
| 1595834 | 7/1970 | France . |
| 388010 | 5/1963 | Switzerland . |
| 6514 | of 1913 | United Kingdom . |
| 974687 | 10/1962 | United Kingdom . |

Primary Examiner—Nicholas P. Godici
Assistant Examiner—P. Weston Musselman, Jr.
Attorney, Agent, or Firm—Edwin E. Greigg

[57] ABSTRACT

A fishing rod has at least one fishing line guide made up of a ring-like body with a high resistance to deformation and wear or abrasion, it being joined to the rod by a winding placed round it and the rod. The winding is made up of a high-strength fiber material having a low ultimate elongation, such as, more specially, carbon fiber, aramide fiber, boron fiber, glass fiber or polyester fiber. The ring body may be made of ceramic material, sapphire or a high-strength carbide and it may be seated on the rod itself or be spaced at some distance therefrom. In the case of a preferred process for producing such a guide on a rod, two template bodies of silicone rubber are slipped onto the rod so that two faces, normal to the rod, on the templates, are opposite each other falling in a space in which the winding may be produced. One such face has a pin for positioning the ring body to be fixed in position. Winding then takes place between the two faces of the template parts using a fiber material impregnated with curing synthetic resin.

19 Claims, 6 Drawing Figures

FISHING ROD

BACKGROUND OF THE INVENTION

The present invention is with respect to a fishing rod having at least one guide or guide eye for a fishing line, and with respect to a process for producing such line guides on fishing rods.

Line guiding eyes as used in the prior art may have two axially running feet which are fixed by winding threads round the feet and the rod. A shortcoming with such an eye system is that a certain length of the rod is made stiffer by the guide eye on it and is, for this reason, not so readily bent as its other parts, such a rod not having the desired properties of, for example, a fly fishing rod and the rod is less to be desired because it does not have the right feel, in view of the stiffer parts, there is no smooth and even suppleness of the rods, this being more specially serious in the case of glass fiber rods.

Furthermore, guide eyes have been produced seated in a ring-like support having a single axial tailpiece for fixing it. Although in the case of this way of fixing the eyes, the length of the part of the rod made stiffer by fixing the guide eye is very much shorter than in the case of fixing using two feet, a system with only one foot has the shortcoming that the support may readily be bent so that the look of the rod is less good and furthermore there will be material fatigue of the support, which may be broken on use.

In a further suggestion made in the prior art, the guide eyes are to be fixed in position on the fishing rod by a pipe-like connection part slipped onto the rod and fixed in position by an adhesive which is melted for producing the joint. Such supports are generally complex to make, because the pipe-like part has to match the diameter of the rod at the position where the eye is to be produced. The connection between the eye and pipe-like part may be bent if not handled carefully and furthermore they are heavy and the adhesive damps vibrations to be conducted along the rod. Lastly, guide eyes have been produced in the prior art having an inner part of a very abrasion-resistant material such as ceramic material, sapphire or silicon carbide for stopping wear by the fishing line as it is pulled through the eyes.

GENERAL OUTLINE OF THE INVENTION

Taking this prior art as a starting point, one purpose of the present invention is that of designing a fishing rod with a new sort of fixing system for the guide eyes so that the eyes do not have any undesired effects on the suppleness of the rod while nevertheless keeping the eyes strongly fixed in position without any need for upkeep and so that there is essentially no chance of the eyes'being broken and broken off. A further purpose of the invention is that such eyes are to have a length of life of the same order as the life of the rod, and the fishing rod having a low weight.

A still further purpose of the invention is that of making it possbile for vibrations to be conducted along the rod in a way which so far has not been possible.

For effecting this purpose and still further purposes, the line guide eye takes the form of a line guide ring body which is fixed on the rod by way of a winding trained round it and round the rod.

The winding may with good effect be made of a high-strength fiber material such as a fiber or thread material of carbon, aramide, boron, glass or polyester fibers which are best impregnated with an aging-resistant synthetic resin and, more specially a one component or a two-component epoxy resin or other curable synthetic resins such a polyester, polyurethane or polymethacrylate resin, or a cyano acrylate type adhesive.

The winding is best made so that it is placed covering the greatest possible part of the axial length of the line guide ring body, that is to say over at least 60% and, more specially, 80 to 100% of the axial length.

The line guiding ring body may have a hollow in its outer face and/or a circumferential groove and is best made of a matrial which is highly resistant to deformation and abrasion, such as aluminum oxide ceramic material, sapphire, silicon carbide, tungsten carbide and other hard ceramic materials and the like. Specially useful effects are furthermore produced on using certain forms of rings made in more than one piece.

Further useful development of the invention are to be seen in the detailed account thereof.

Because of the way the line guide eyes are produced in the invention on the fishing rod the suppleness of the fishing rod is in no way worse or changed, because the fixing part for the line guides or eyes only takes up a very small length of the fishing rod and the axial ultimate elongation of the impregnated winding is greater than the elongation of the axial part of the rod at the position of the line guide. By the use together of a fiber material with a high tensile strength and a low stretch with a ring material with a high resistance to deformation and abrasion, the line guides on the fishing rod are fixed in position in a trouble-free way for a long working life. The system for joining the guides is not damages by corrosion, is not in need of any upkeep and is light in weight. It generally gives the feel and properties of a very homogeneous nature of the fishing rod, made in one piece, something which is desired in view of good vibration properties desired for fishing. Furthermore, the joint between the guides and the rod are very sturdy.

A further important useful effect is that the way of fixing of the present invention may be used for a great number of different sorts of fishing rods with different diameters. In comparison with a fishing rod with "snake rings" the present fishing rod is responsible for the useful effect that the fishing line may be kept at a distance from the rod and there is no chance of it sticking to the rod, more specially when the rings used have an eccentric one-sided opening or are spaced from the rod.

LIST OF FIGURES

A detailed account will now be given of preferred embodiments of the invention using the figures.

DETAILED ACCOUNT OF WORKING EXAMPLES OF THE INVENTION

Figure 1:
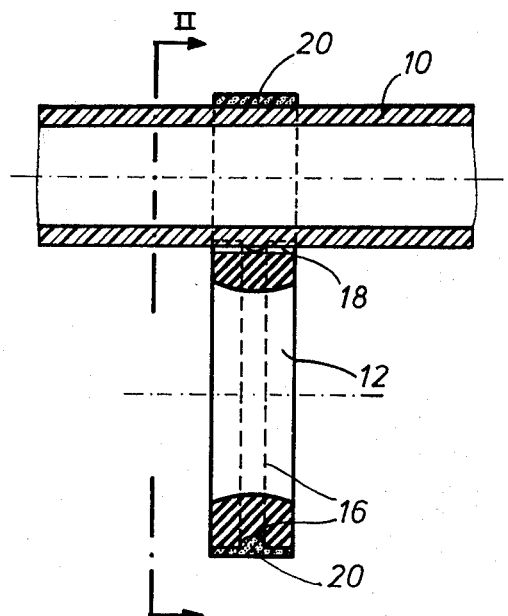
FIG. 1 is a view of part of a fishing rod as a first example of the present invention, a guide being positioned on the rod for a fishing line (not figured).

In FIG. 1 it will be seen that part of a fishing rod 10 has a line guide or guide eye made up of ring body 12 for a line (not figured) and which, but for the way in which the ring body 12 is fixed on the rod 10, may be of known design.

Figure 3:
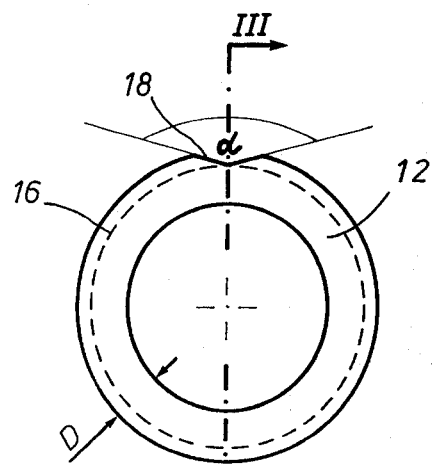
FIG. 3 is an axial view of a ring body.
Figure 4:
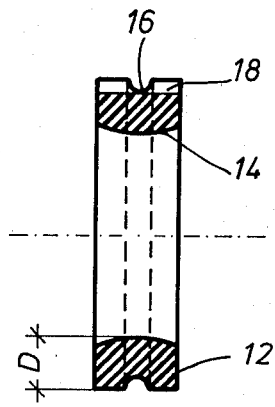
FIG. 4 is an axial section of the guide ring body of FIG. 3.

The ring body 12 for guiding the line, to be seen in FIGS. 3 and 4, is made up of hard ceramic material, and more specially aluminum oxide ceramic material, or any other stiff abrasion-resistant material which keeps its form, as for example sapphire, silicon carbide, tungsten carbide etc. As a guide ring body it is possible to make use for example of the inner part of a known line guiding ring system.

The line guiding ring body 12 has, as seen in axial section, a somewhat inwardly curving side 14 and an outer or circumferential side having a rounded hollow 16. Such hollow or groove might have a different axial section, as for example an undulated or a square one.

In the case of the working example of the invention to be seen in FIGS. 1 to 4, the fishing line guide ring body 12 furthermore has a hollow 18, which, as figured, may be wedge-shaped, the flat side walls of the hollow being best at an angle $\alpha$ of about 145° to each other (see FIG. 3). The depth of the hollow is best 1/5 to 1/4 of the radial thickness D (FIG. 4) of the ring body. The hollow 18 may more specially be designed stretching as far as the floor of the circumferential groove 16.

The angle $\alpha$, formed between the walls of hollow 18, may furthermore have a different size, but it is best for it to keep to a range of 130° and 170°.

In the assembled condition, the line guiding ring body 12 with the axial hollow 18 is seated on the rod 10, see FIG. 1, and it is joined up with the rod by a winding 20 placed round the rod 10 and the line guiding ring body 12 in the circumferential direction. Winding 20 is best impregnated or adhesively processed with an aging-resistant synthetic resin as for example a one or two-component resin such as an epoxy resin or a polyester, polyurethane or polymethacrylate resin or a cyano acrylate base adhesive so that a smooth outer face is produced without any sharp edges and recurrent corners. It is furthermore possible for a ring body without any axial hollow 18 to be used, The winding 20 is best made of carbon, aramide, boron, glass or polyester fiber or thread material, the first of the materials in this list being most preferred and the last one least. The ultimate elongation of the winding is to be at the most 2.5% and, more specially, about 0.8%. Between the winding 20 and the fishing rod 10 and within the winding 20 placed round the ring 12 and the rod 10 there is a body 22 of synthetic resin mass or a space may be kept unfilled, any such filling not being given in detail in the figure. The synthetic resin mass is best such that it has the same properties as the synthetic resin used for impregnating and cementing the winding and it is, more specially, filled with a short-fiber reinforcing material as for example short carbon or glass fiber pieces. The synthetic resin mass body 22 and the synthetic resin mass for impregnating the winding 20 may be colored with a material having the same color as the fishing rod 10 or the ring body 12, or the synthetic resin may be painted with the desired color. An especially pleasing appearance is obtained if the fibers, resin and dye are transparent or translucent.

Figure 5:
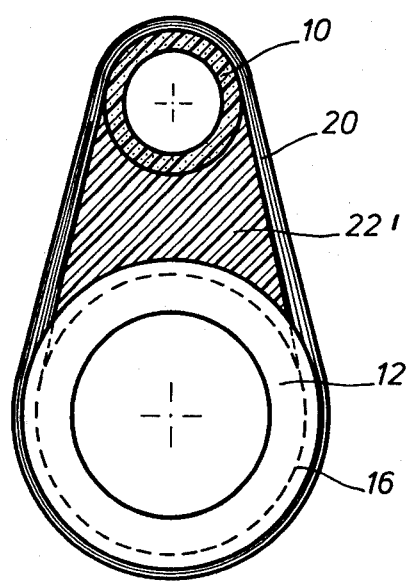
FIG. 5 is a view on the same lines as FIG. 2 of a further embodiment of the invention.

The working example of the invention noted is specially useful in the case of fly fishing rods. FIG. 5 is a view of a further working example of the invention which has specially good properties as desired for heavier fishing rods.

Figure 2:
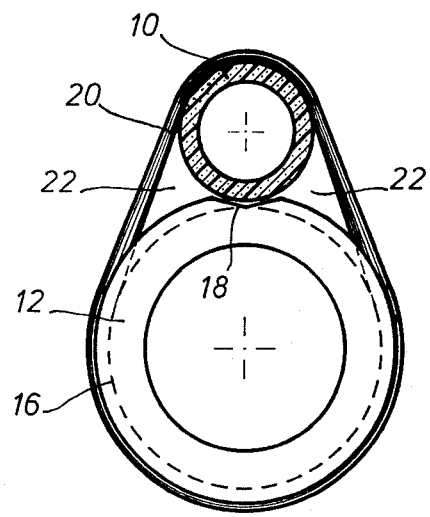
FIG. 2 is a view in the plane II—II of FIG. 1.

In the working example of FIG. 5 the line guiding ring body 12 is spaced from rod 10 and as was the case with the working example of FIGS. 1 and 2 the line guiding ring body 12 and the rod 10 are joined together by a synthetic resin impregnated and cemented winding 20 made up of high-strength fiber material. The space between the rod 10, the line guiding ring body 12 and the winding 20 taken up by a body of synthetic resin material 22' with a filling of reinforcing man-made fibers, as for example short carbon or glass fibers. As a synthetic resin for impregnating and cementing the fibers of winding 20 and as synthetic resin 22' for filling up the space noted, any of the synthetic resins noted earlier may be used but, however, at the present a two-component epoxy resin is preferred.

In the case of the working examples of the invention so far noted, the line guiding ring body is made of a stiff, wear-resistant material. However, it is furthermore possible to make use of ring bodies made up of more than one part, as for example will be seen in FIG. 6.

Figure 6:
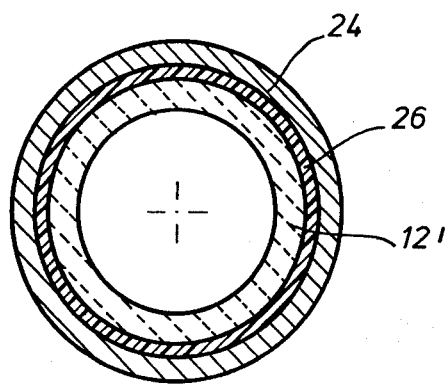
FIG. 6 is an axial view of a line guiding ring body made in more than one piece.

The line guiding ring body of FIG. 6 has a body 12' of a stiff, wear-resistant material as noted in connection with the line guiding ring bodies 12. Ring body 12', which may for example be made of hard ceramic material, is placed within a ring 24 of high-strength metal such as hardened stainless steel. Between ring 12' and ring 24 there is an inbetween layer 26 for joining them together and made of a material which is softer or more elastic than the materials of rings 12' and 24. The design of FIG. 6 gives the useful effect that the body 12' which is generally brittle is safeguarded by inbetween layer 26 against forces acting on the outside, such as blows and which take effect on the outer ring 24 of metal, which is tougher and, for this reason, less likely to be damaged than ceramic and like materials.

For producing the winding on the fishing rod, it is possible to make use of two silicone rubber bodies, or bodies of an other rubber-like material as for example polyurethane or polysulfide, which have holes and, if desired, may be slotted, and which are pushed onto the rod so that they are spaced from each other with their end faces normal to the rod at a distance between them equal to the axial length of the ring body. The ring body to be fixed in position is so placed between the faces normal to the rod that it takes up the desired position in relation to the rod. For supporting the ring body and locking it into position, one normal face of one body may have a small head. The next step is that of winding fiber material impregnated with synthetic resin between the normal faces of the bodies round the ring and the fishing rod. After the synthetic resin has gelled, the one rubber body may be taken off and the inbetween spaces between the ring body and the rod may be filled with a body of short-fiber reinforced synthetic resin at 22 or 22' (FIG. 5). Then the rubber body may be pushed off again. Any sharp edges or flash on the cemented winding may be smoothed by grinding.

An account will now be given of the best mode of the way of producing such rings as part of the invention.

Firstly a plate of a low-adhesion synthetic resin, as for example a 3 mm thick plate of PVC or polystyrene has a somewhat eccentric hole produced in it and the hole is then machined using a lightly coned miller or a reamer so that it has such a diameter that when slipped on the rod, it takes up such a given position (because of the rod's taper) that it is about 30 mm from the position at which the line guide is to be produced, that is to say at which the ring body is to be fixed in position, it being on a part of the rod which is thicker than at the position where the line guide is to be produced. Then a tube with a length of about 60 to 70 mm is joined up with the plate, the tube being placed round the rod and being best made of a brittle material such as acrylic resin or glass so that it may be taken off by smashing it. After the tube has been joined to the plate (this best being done by an adhesive which may be stripped from the plate again so that the plate may be used more than once) curing rubber material such as silicone rubber is filled into the tube and after curing of the rubber material, the plate and the tube with the hardened rubber body are pulled off the fishing rod, the plate is taken from the tube and the tube, together with the rubber body within it, is now cut in a direction normal to the axis of the tube at a position, which is somewhat further along the rod in a direction in which the rod becomes thinner, from the position on which the line guide is to be produced (this spacing being for example the breadth or axial length of the ring body). The end face produced by cutting on the rubber bodies produced are then trued by grinding and the parts of the tubes are smashed so that the rubber bodies are uncovered. The rubber body which was on the thickest part of the rod in relation to the position of producing the eye, is now axially slotted as far as the hole made by the fishing rod so that the rubber body can be removed laterally. The rod is pushed into the other rubber body without any great force being needed and the ring body which is to be fixed in position, is so placed on the trued-up end face (normal to the rod) that it is resting against the fishing rod or has a desired distance therefrom. Now the opening in the ring body is filled with curing rubber material. After the rubber has cured, it being joined to the trued-up end face, a pin-like head is produced on the trued-up face for positioning the ring body which is to be fixed in position.

Curing rubber materials such as silicone rubber undergo shrinkage on curing of the order of 2%. If, for this reason, the two template bodies formed, in the way noted, are pushed to the points on the fishing rod where they were on casting, it will be noted that they are well seated on the rod because of the shrinkage and the guide ring body will be kept strongly in position.

The next step is that of winding the fiber material impregnated with curing synthetic resin between the two normal, trued-up faces and the synthetic resin is then cured using a hot air blower, at least till gelling takes place. Now the template body without the positioning head on the thicker side of the rod is pulled back to some distance and the space within the winding and round the ring body and the rod is filled up with fiber reinforced synthetic resin material. A specially strong joint is produced if the synthetic resin used for impregnating the winding has not so far become fully cured. The template body seated on the part of the rod to the side of the eye to be produced which is thicker is then pushed back again and the filled-in synthetic resin is cured by heating with a hot air blower. The last step is taking off the template.

The line guide eyes are fixed on the rod one after the other starting with the rod's thicker end. The synthetic resin plates and the template bodies used in this respect are marked and stored for use later with other rods of generally the same size.

I claim:

1. A fishing rod comprising at least one line guide attached to said rod, said line guide comprising an annular body made of wear-resistant material and having an essentially cylindrical outer surface in contact with said rod, a resin impregnated winding of a plurality of turns wound in a circumferential direction both around said annular body and said rod to hold said annular body in surface contact with said rod, said resin impregnated winding covering up to 100% of the axial length of said annular body with a synthetic resin positioned in a space between said rod, said guide and said windings.

2. A fishing rod as claimed in claim 1 wherein said winding is made of a material selected from the group: carbon fiber, aramide fiber, boron fiber, glass fiber, polyester fiber.

3. A fishing rod as claimed in claim 1, wherein said winding is impregnated with a cementing synthetic resin.

4. A fishing rod as claimed in claim 1, wherein said ring body has an axially running hollow in its outer face for contacting a part of the rod and giving a strong seating effect of the body on the rod.

5. A fishing rod as claimed in claim 1 wherein said ring body is made up of a material selected from the group: ceramic material, sapphire, high-strength carbide.

6. A fishing rod as claimed in claim 1 having a strong metal ring positioned round said ring body and an inbetween layer of material therebetween, which is softer than the material of said ring body and said ring.

7. A fishing rod as claimed in claim 1, wherein said ring body has a circumferential groove to take up the winding.

8. A fishing rod as claimed in claim 2, wherein the winding covers up at least 60 to 100% of the axial length of the ring body.

9. A fishing rod comprising at least one line guide including an annular ring body of a wear-resistant and deformation-resistant material, said ring body being spaced clear of said rod with a synthetic resin positioned between said annular body and said rod and a resin impregnated winding trained circumferentially around said annular body and said rod such that the resin impregnated winding and the synthetic material are within the length of the annular body.

10. A fishing rod as claimed in claim 9, having short fiber reinforcement material in said synthetic resin.

11. A fishing rod as claimed in claim 9 wherein said winding is impregnated with a cementing synthetic resin.

12. A fishing rod as claimed in claim 9 wherein said ring body is made up of a material selected from the group: ceramic material, sapphire, high-strength carbide.

13. A fishing rod as claimed in claim 9 having a strong metal ring positioned round said ring body and an inbetween layer of material therebetween, which is softer than the material of said ring body and said ring.

14. A fishing rod as claimed in claim 9 wherein said ring body has a circumferential groove to take up the winding.

15. A fishing rod as claimed in claim 9, wherein said winding is made of a material selected from the group: carbon fiber, aramide fiber, boron fiber, glass fiber, polyester fiber.

16. A fishing rod as claimed in claim 11 having short fiber reinforcement material in said synthetic resin positioned between the ring body and the rod.

17. A fishing rod as claimed in claim 11, wherein said winding is made of a meterial selected from the group: carbon fiber, aramide fiber, boron fiber, glass fiber, polyester fiber.

18. A fishing rod as claimed in claim 12, wherein said winding is made of a material selected from the group: carbon fiber, aramide fiber, boron fiber, glass fiber, polyester fiber.

19. A fishing rod comprising at least one line guide including an annular ring body of a wear-resistant and deformation-resistant meterial, said ring body including a synthetic resin between the ring body and the rod, and a resin impregnated winding trained around said annular body and said rod such that the resin impregnated winding and said synthetic material are within the width of the annular body.

* * * * *